(12) United States Patent
Chang et al.

(10) Patent No.: US 6,430,138 B2
(45) Date of Patent: Aug. 6, 2002

(54) BIFOCAL OPTICAL PICKUP HEAD

(75) Inventors: Hung-Lu Chang, Taichung; Tzu-Ping Yang, Taipei; Der-Ray Huang, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/799,382

(22) Filed: Feb. 27, 2001

Related U.S. Application Data (62) Division of application No. 09/262,962, filed on Mar. 4, 1999, now Pat. No. 6,236,633.

(51) Int. Cl.⁷ ................................................. G11B 7/00
(52) U.S. Cl. .............................. 369/112.14; 369/112.24
(58) Field of Search ..................... 369/112.14, 112.1, 369/44.23, 44.24, 112.05, 112.22, 112.13

(56) References Cited

U.S. PATENT DOCUMENTS 5,917,800 A * 6/1999 Choi ........................ 369/112

* cited by examiner

*Primary Examiner*—Nabil Hindi
(74) *Attorney, Agent, or Firm*—W. Wayne Liauh (57) ABSTRACT

A bifocal optical pickup head is disclosed for use in a optical pickup apparatus having a single objective lens, for generating two different focuses (bifocus) to access a compact disc (CD) and a digital versatile disc (DVD), which the thickness is different. When a beam passes through an optical element disclosed in the present invention, numerical aperture is controlled and spherical aberration is reduced by the optical element due to variations in optical path and radius. Therefore, after beams having different numerical apertures are focused by an objective lens, various focuses can be obtained.

5 Claims, 8 Drawing Sheets

BIFOCAL OPTICAL PICKUP HEAD

This application is a division of Ser. No. 09/262,962, filed May 4, 1999, now U.S. Pat. No. 6,236,633.

BACKGROUND OF THE INVENTION

The present invention relates to a bifocal optical pickup head, and more particularly to an optical pickup apparatus used with a single objective lens for accessing a compact disc (CD) and a digital versatile disc (DVD), which are different in thickness A technique of accessing data recorded on a surface of an optical disc such as CD or DVD by an optical pickup head has been known. In reading, a laser beam is focused on a data storage surface of the optical disc and the beam reflected from the optical disc is converted to an electric signal by a photo detector. In writing, the above procedures are inverted. The specifications of CD and DVD are shown in Table 1.

TABLE 1

|  | Thickness (mm) | Track pitch ($\mu$m) | Wavelength (nm) | NA (numerical aperture) |
| --- | --- | --- | --- | --- |
| CD | 1.2 | 1.6 | 780 | 0.45 |
| DVD | 0.6 *2 | 0.74 | 635–650 | 0.6 |

As know from Table 1, in comparison with CD, DVD has a higher storage density. The differences in dimension (especially the storage density difference) result in various reading requirements for an optical pickup apparatus. To access data on a data storage surface of a CD or a DVD, an optical pickup head is a key component in the optical pickup apparatus, and optics is most critical in the optical pickup head.

Therefore, to access both CD and DVD by an optical pickup apparatus having a single objective lens, it is necessary to design an optics in which beam spot size is changed on the basis of two different numerical apertures.

To meet compatible requirement for CD and DVD, it is necessary to access both CD and DVD with a single optical pickup head, and how to obtain a bifocal optics is a critical technique.

Conventional techniques of accessing both CD and DVD with a bifocal optical pickup head are listed as follows:

1. Two objective lenses having different focal lengths corresponding to CD and DVD respectively are used, and a driving mechanism is utilized to select one of the objective lenses. Such a design has disadvantages of increased weight of an optical pickup head and increased manufacturing cost.
2. A diffraction element is used to achieve bifocal effect.
3. A holographic optical element is used for bifocus. However, it suffers from manufacturing difficulty and high manufacturing cost.
4. A NA controller is constructed by a liquid crystal display (LCD) shutter such that an objective lens has two NA values, thereby achieving bifocus. However, the orientation of the polarization of a laser source needs to be accurately aligned, and the LCD should be continuously powered.
5. An annular objective lens is used in which beams passing through center of the lens are for CD while beams passing though inner and outer rings thereof are for DVD. A similar technique is disclosed in U.S. Pat. No. 5,665,957 in which a hologram lens having a pattern thereon is used for bifocus. However, its manufacturing cost is high and mounting tolerance is low.
6. Two light sources and two lens are used. For example, according to U.S. Pat. No. 5,777,970, two laser sources of different wavelengths correspond to respective lenses to provide respective focal lengths and spots of respective diameters. It has disadvantages of high manufacturing cost and complicated structure.
7. A zooming aperture is utilized in association with a movable objective lens, as shown in U.S. Pat. No. 5,659,533 and U.S. Pat. No. 5,281,797.

SUMMARY OF THE INVENTION

An object of the present invention is to provide a bifocal optical pickup head having advantages of simple structure, low cost, easy assembly and high tolerance.

According to a bifocal optical pickup head of the present invention, to access both CD and DVD, an optical element is used in association with a conventional optical pickup head comprising a laser diode, a beam splitter (or holographic optical element (HOE)), a collimator lens, an objective lens and a photo detector, without adding any other optical elements such as zooming aperture, movable objective lens or dual objective lenses.

Another object of the present invention is to provide an optical element adapted to a conventional optical pickup head, holographic optical pickup head or two-source optical pickup head. The optical element splits a single laser beam into two laser beams of different optical paths, which are collimated by a collimator lens and then focused by an objective lens to achieve two focuses.

According to the present invention, an optical element disposed in a light path is disclosed. When a beam passes through the optical element, numerical aperture is controlled and spherical aberration is reduced by the optical element due to variations in optical path and radius. Therefore, after beams having different numerical apertures are focused by an objective lens, various focuses can be obtained.

When a monochrome beam undergoes two different optical paths, two focuses can be obtained. According to the present invention, a cylinder or a circular recess is provided at center of a prior art optical element, such as three-beam grating or holographic optical element, to split a laser beam into two. An optical path difference is caused by the cylinder or circular recess, and NA of the optical element is controlled, such that the beam completely passing through the optical element is used for DVD and the beam passing through the cylinder or circular recess is used for CD.

These and other objects, features and advantages of the present invention will become apparent to those skilled in the art upon consideration of the following description of the preferred embodiments of the present invention taken in conjunction with the accompanying drawings

DETAILED DESCRIPTION OF THE PREFERRED EMBODIMENT

Figure 1:
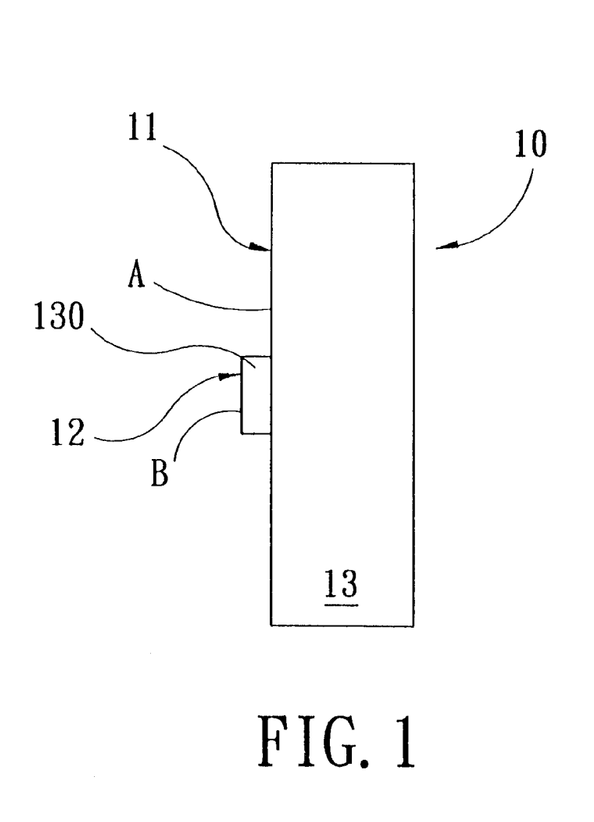
FIG. 1 shows an optical element of a first embodiment.

Referring to FIG. 1, an optical element 10 having a first refraction surface 11 and a second refraction surface 12 perpendicular to axis of a laser beam in an optical pickup head. The refraction surfaces 11 and 12 are located at different places corresponding to different optical paths and different radiuses of the laser beam. For example, a protruded cylinder 130 is formed at a side of a flat transparent body 13 such as glass plate or quartz plate having a high transmittance. Surface A of the transparent body 13 at the same side with the cylinder 130 is formed as the first refraction surface 11, while axial end surface B of the cylinder 130 is formed as the second refraction surface 12. The surface A and the axial end surface B are concentric such that a laser beam will be split into two beams of different optical paths when it passes through the refraction surfaces 11 and 12. Then the beams are collimated and pass through an objective lens to form two spots of different focuses.

Preferably, the radial section of the cylinder 130 has a shape depending on sectional shape of the laser beam to enhance the efficiency thereof. The optical element 10 is manufactured by photolithography to perform pattern transfer, followed by etching wherein a desired etched depth can be obtained by controlling the etching time. Of course, injection molding or the likes can be employed instead.

Figure 2:
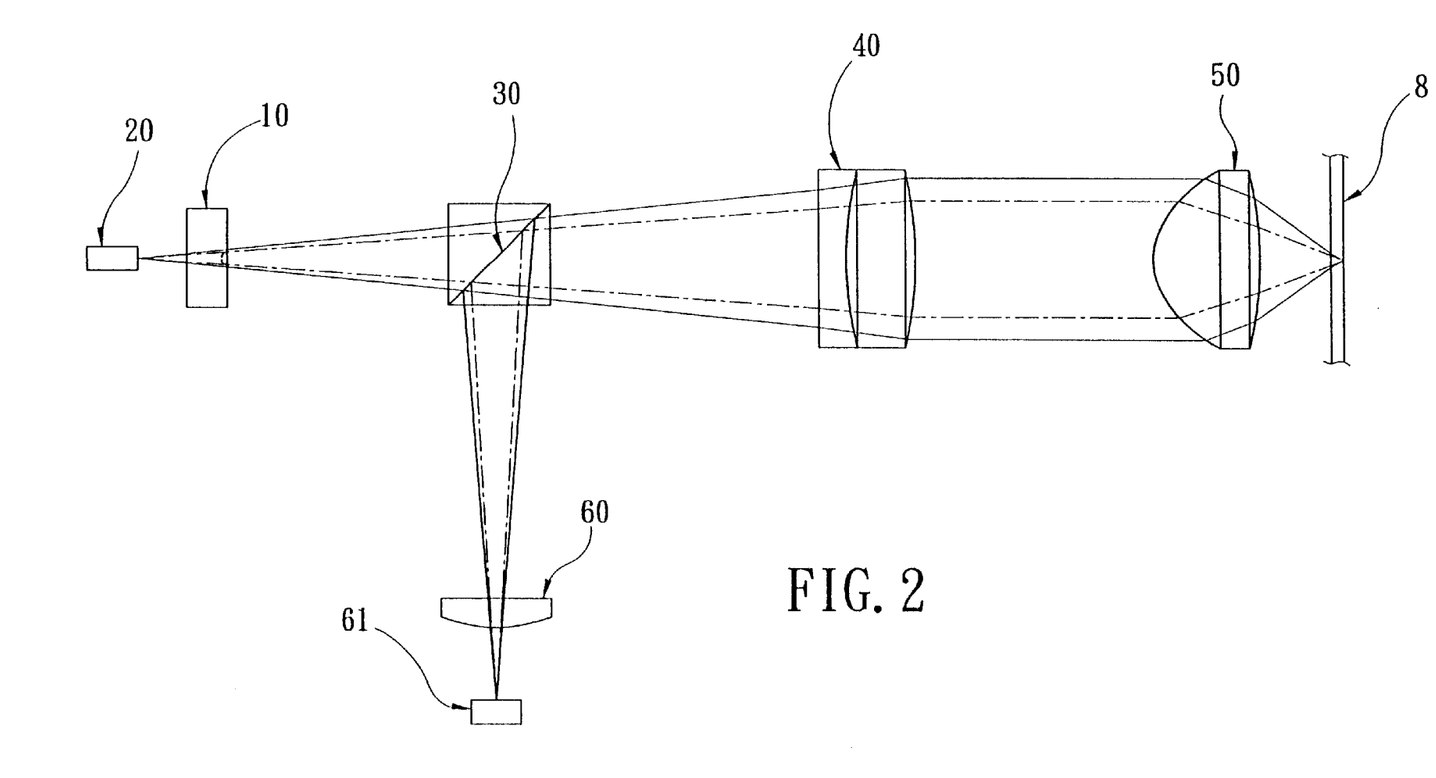
FIG. 2 shows a bifocal optical pickup head of the first embodiment of the present invention.

FIG. 2 shows a bifocal optical pickup head of a first embodiment of the present invention. The bifocal optical pickup head comprises: a laser diode 20 for generating a laser beam for accessing an optical disc 8 (CD or DVD); an optical element 10 for splitting the laser beam emitted from the laser diode 20 into two beams of different optical paths; a beam splitter cube 30 for separating the two laser beams of different optical paths from a reflection beam from the optical disc 8 (CD or DVD); a collimator lens 40 for collimating the beams as a parallel beam; an objective lens 50 for focusing the parallel beam including the two laser beams of different optical paths on a data storage surface of the optical disc 8 (CD or DVD); a photo detector 61 for converting the reflection beam from the optical disc 8 (CD or DVD) into an electric signal; and a condensing lens 60 for focusing the reflection beam from the beam splitter cube 30 on the photo detector 61.

Figure 3:
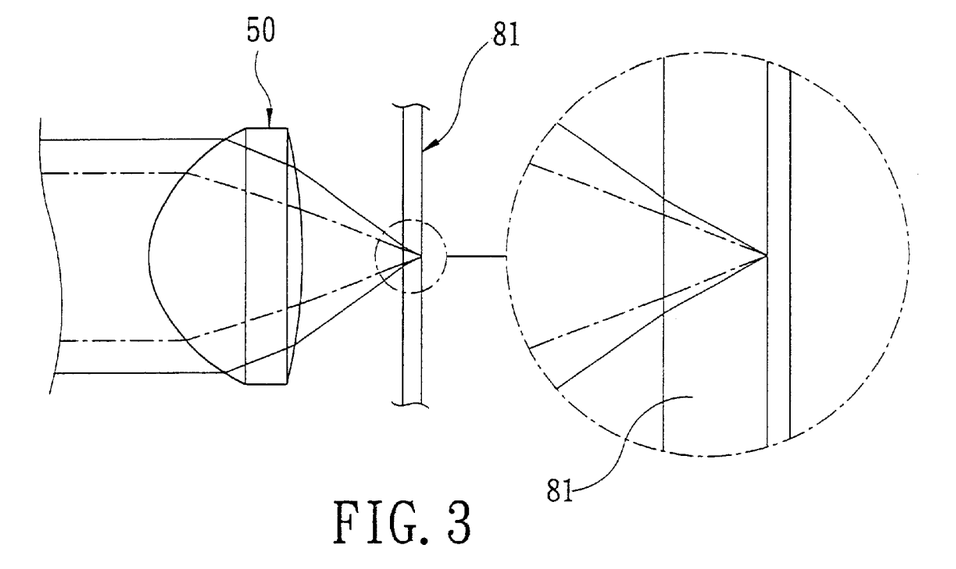
FIG. 3 is a partially enlarged view showing a beam focused on a DVD.
Figure 4:
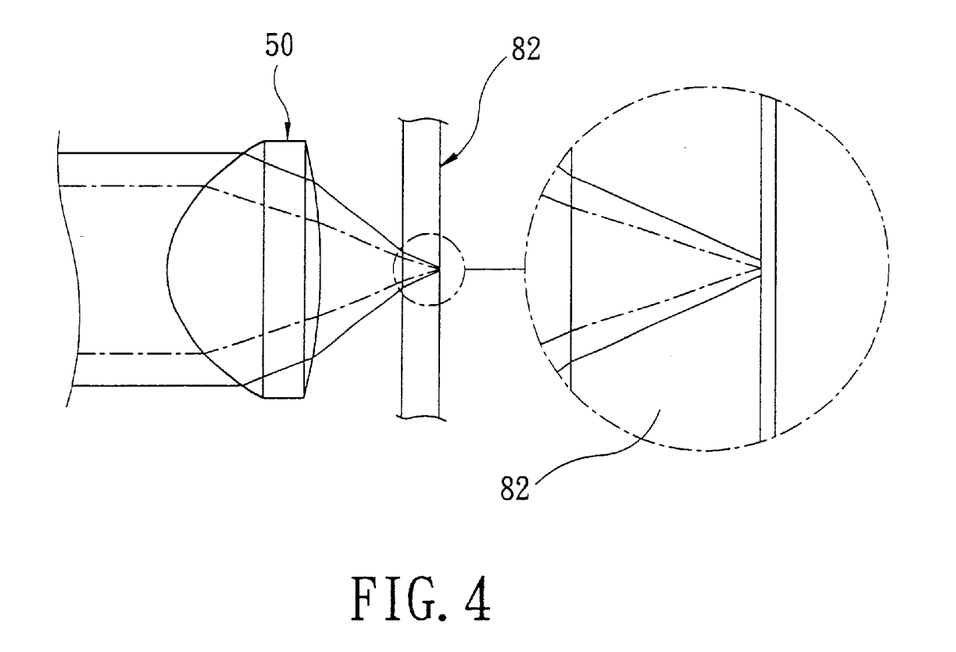
FIG. 4 is a partially enlarged view showing a beam focused on a CD.

As clear from FIG. 2, the laser beam for accessing the optical disc 8 (CD or DVD) is emitted from the laser diode 20 through optical element 10 where it is split into two laser beams of different optical paths. Then, these two beams pass through the collimator lens 40 and the objective lens 50, and are focused on the data storage surface of the optical disc. These two beams passes through the first refraction surface 11 and the second refraction surface 12, respectively. One of the beams having higher efficiency is used for DVD 81 (referring to FIG. 3), while the other which passes through only the cylinder 130 is used for CD 82 (referring to FIG. 4). Therefore, by the aid of the optical element 10 of the present invention, to access both CD 82 and DVD 81, the collimator lens 40 and the objective lens 50 are employed and no other optical devices such as zooming aperture, movable objective lens or dual objective lenses are necessary.

To align center of the cylinder 130 with the laser beam center can easily assemble the optical element 10. Further, since the beam reflected from the optical disc surface passes through the condensing lens 60 to the photo detector 61 via the beam splitter cube 30 and does not returned to the optical element 10, the assembly tolerance is higher.

Figure 5:
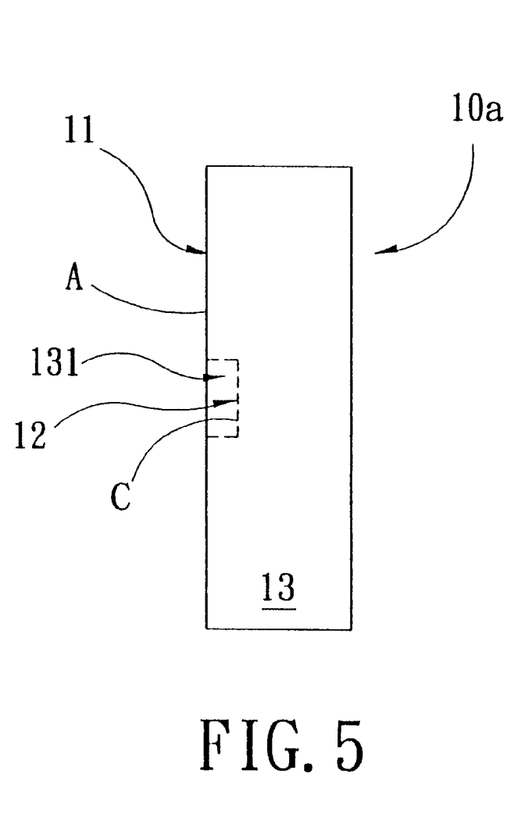
FIG. 5 shows an optical element of a second embodiment.

FIG. 5 shows another preferred embodiment of an optical element 10a wherein a cylindrical recess 131 is formed on surface of a flat transparent body 13. Axial end surface C of the cylindrical recess 131 acts as second refraction surface 12 like axial end surface B in FIG. 1.

Figure 6:
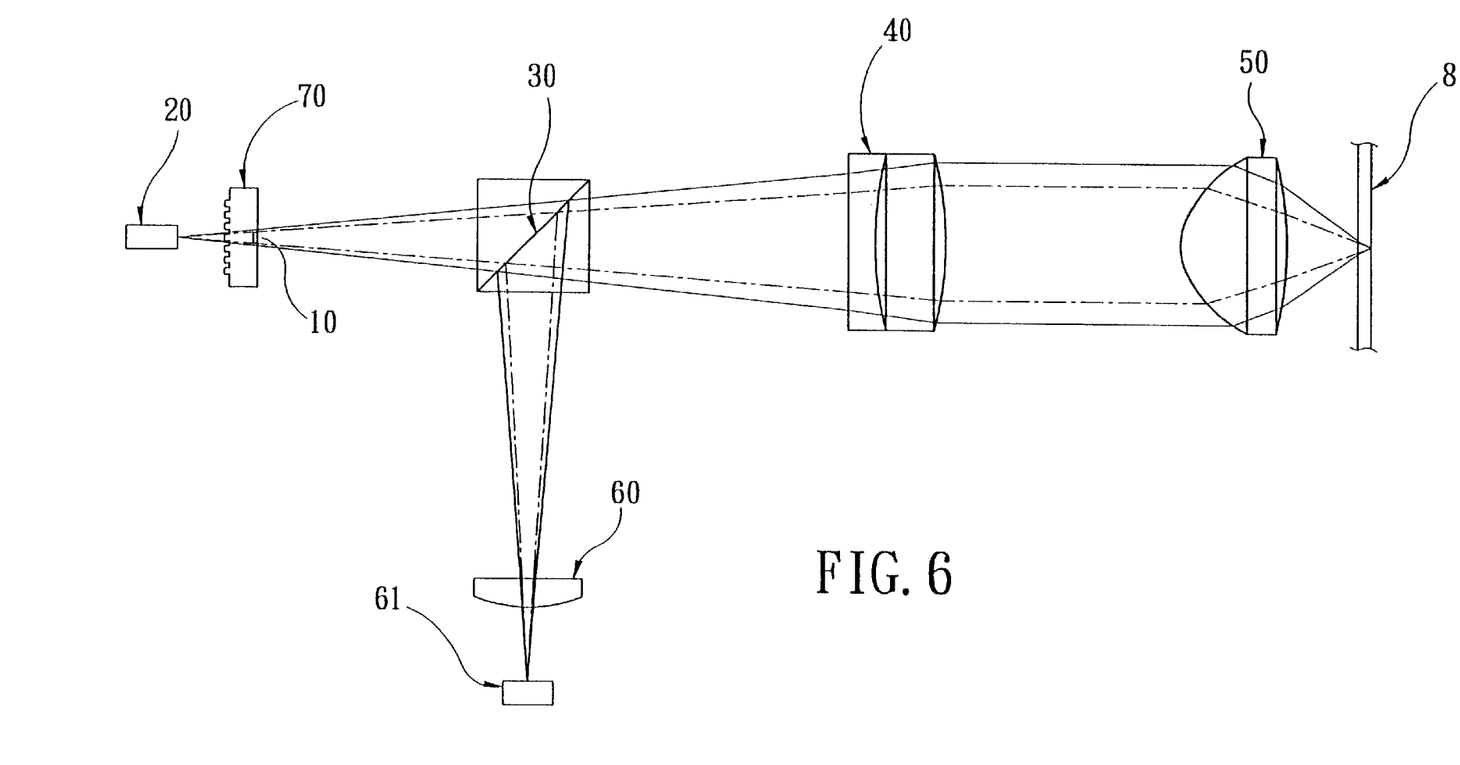
FIG. 6 shows a bifocal optical pickup head of the second embodiment of the present invention in which the optical element is used with a conventional optical pickup head.

FIG. 6 shows a bifocal optical pickup head of a second embodiment of the present invention in which how to use an optical element 10 of the present invention with a conventional optical pickup head is disclosed. The bifocal optical pickup head comprises: a laser diode 20 for emitting a laser beam for accessing an optical disc 8 (CD or DVD); a three-beam grating 70; an optical element 10; a beam splitter 30; a collimator lens 40; an objective lens 50; a condensing lens 60; and a photo detector 61.

In this embodiment, the optical element 10 can be formed as shown in FIG. 1 or FIG. 5, and can be directly integrated on back of a three-beam grating 70 or the like.

Figure 8:
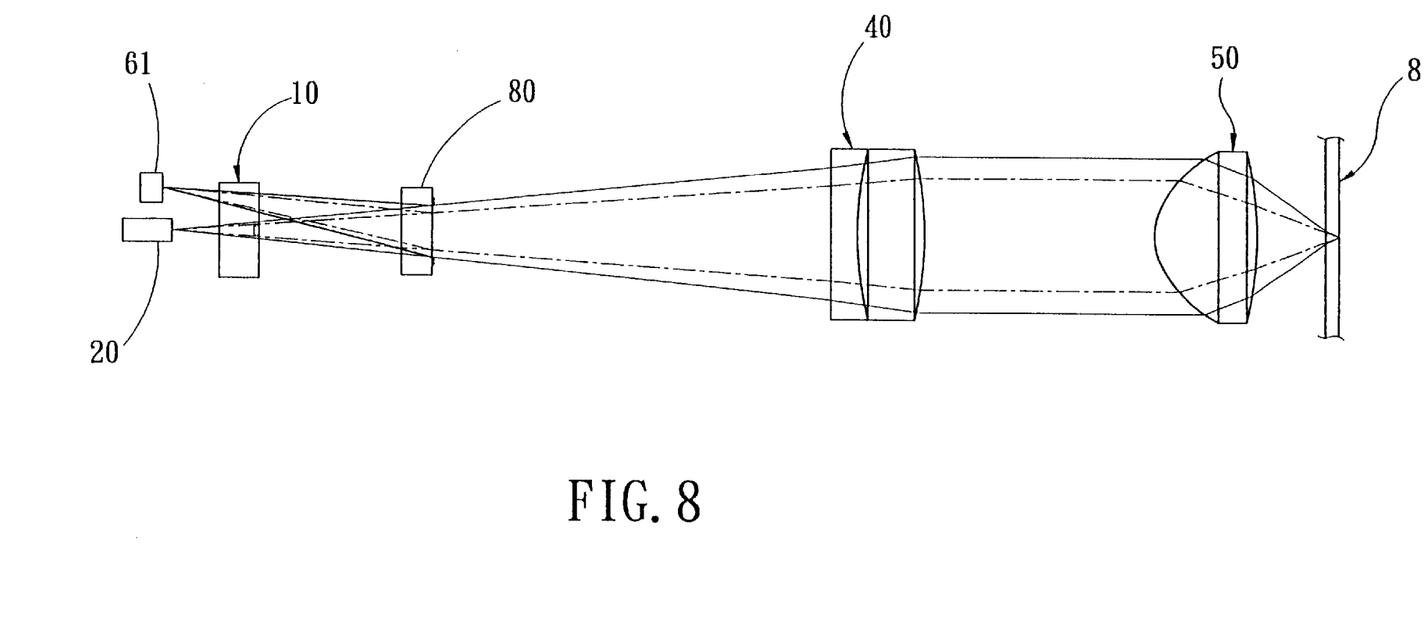
FIG. 8 shows a bifocal optical pickup head of the third embodiment of the present invention in which the optical element is used with a holographic optical pickup head.

A holographic optical pickup head shown in FIG. 8 comprises: a laser diode 20 for emitting a laser beam for accessing an optical disc 8 (CD or DVD); an optical element 10 as shown in FIG. 1 or 5 for splitting the laser beam emitted from the laser diode 20 into two beams of different optical paths; a holographic optical element (HOE) 80 for separating the two laser beams of different optical paths from a reflection beam from the optical disc 8 (CD or DVD); a collimator lens 40 for collimating the laser beams passing through the holographic optical element 80 as a parallel beam; an objective lens 50 for focusing the parallel beam including the two laser beams of different optical paths on a data storage surface of CD 82 or DVD 81; and a photo detector 61 for converting the reflection beam from the holographic optical element 80 into an electric signal.

Figure 7:
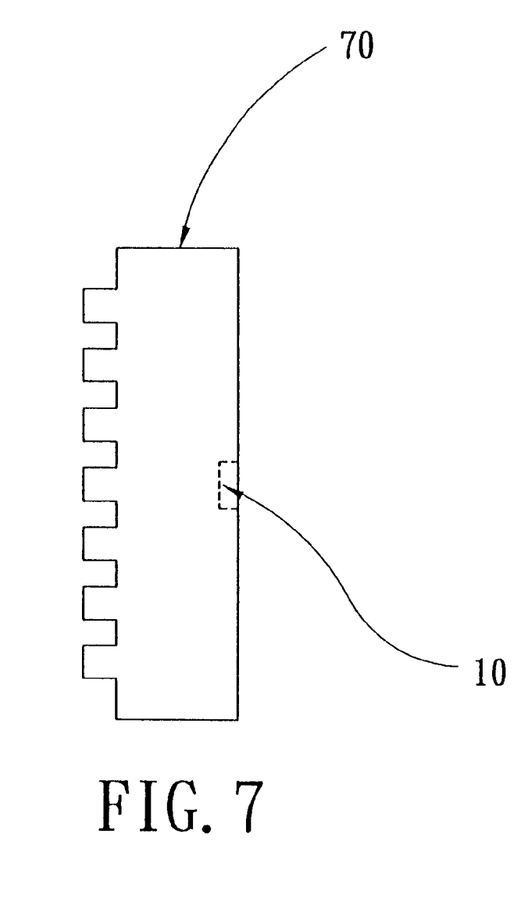
FIG. 7 shows an optical element of a third embodiment in which the optical element is provided in a three-beam grating.
Figure 9:
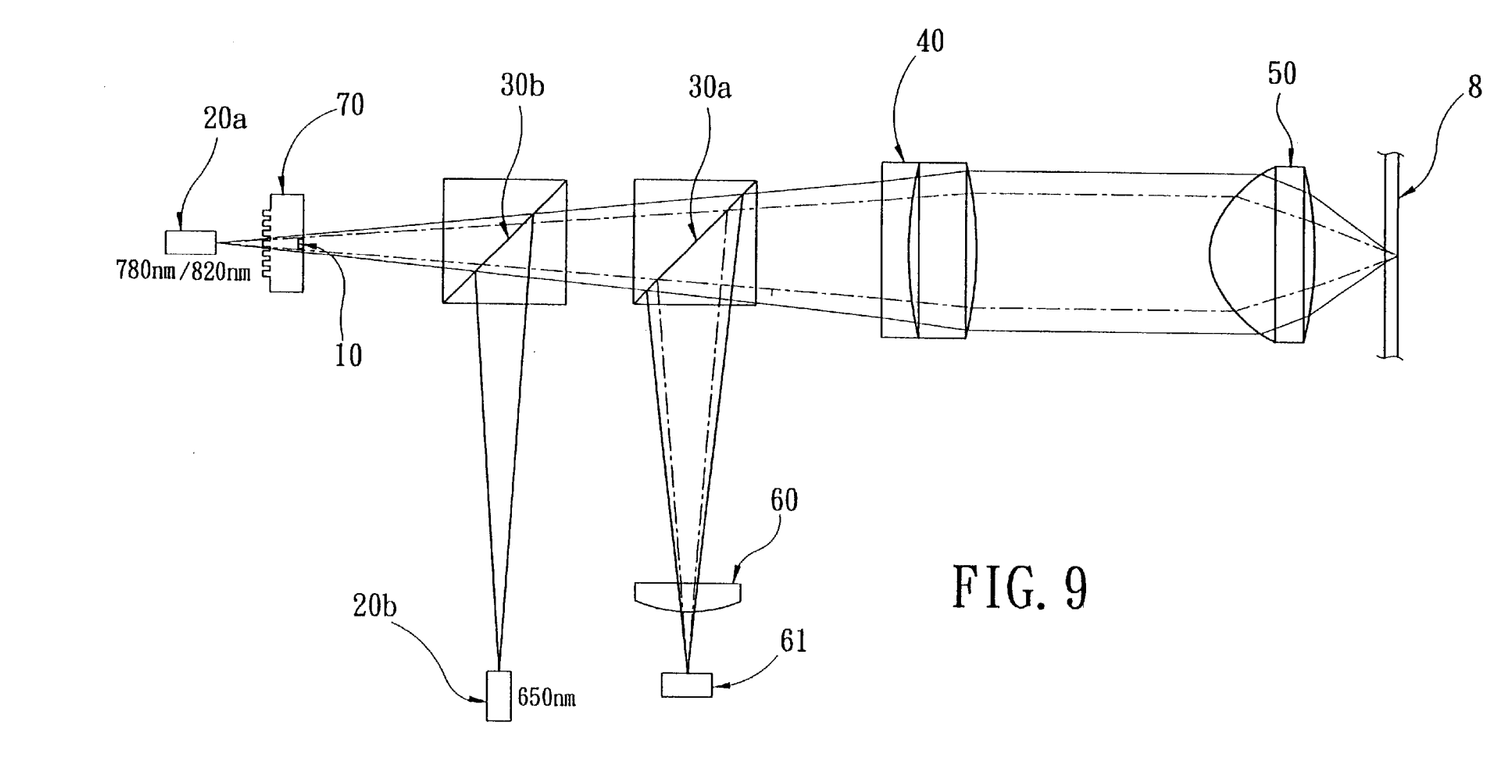
FIG. 9 shows a bifocal optical pickup head of a fourth embodiment of the present invention in which the combination of an optical element and a three-beam grating is used with a two-source optical pickup head.

In FIG. 9, a two-source optical pickup head is shown in which an optical element 10 is integrated with a three-beam grating 70 (as shown in FIG. 7). As shown, two laser diodes, i.e., first laser diode 20a and second laser diode 20b, which generate laser beams of different wavelengths, are used to access different optical discs 8 (CD or DVD) respectively. The laser beam emitted from the first laser diode 20a passes through the combination of the optical element 10 and the three-beam grating 70, a collimator lens 40 and an objective lens 50, and then is focused on a data storage surface of the optical disc 8. The laser beam emitted from the second laser diode 20b passes through a first beam splitter cube 30a, the collimator lens 40 and the objective lens 50, and then is focused on the data storage surface of the optical disc 8. The laser beam reflected from the data storage surface of the optical disc 8 passes through a second beam splitter cube 30b and a condensing lens 60, and then is focused on a photo detector 61 where the laser beam representing a photo signal is converted into an electric signal.

In the example shown in FIG. 9, if the first laser diode 20a emits a laser beam having wavelength of 780 nm, the inner portion of the laser beam is used to access CD, and another laser beam having wavelength of 650 nm from the second laser diode 20b is used to access DVD. Therefore, an optical pickup head capable of selectively accessing CD or DVD by the objective lens 50 is formed. If the first laser diode 20a is a SHG laser with wavelength of 820 nm, the inner portion of the laser beam accesses CD while the laser beam of second harmonic with wavelength of 41 nm accesses DVD.

Figure 10:
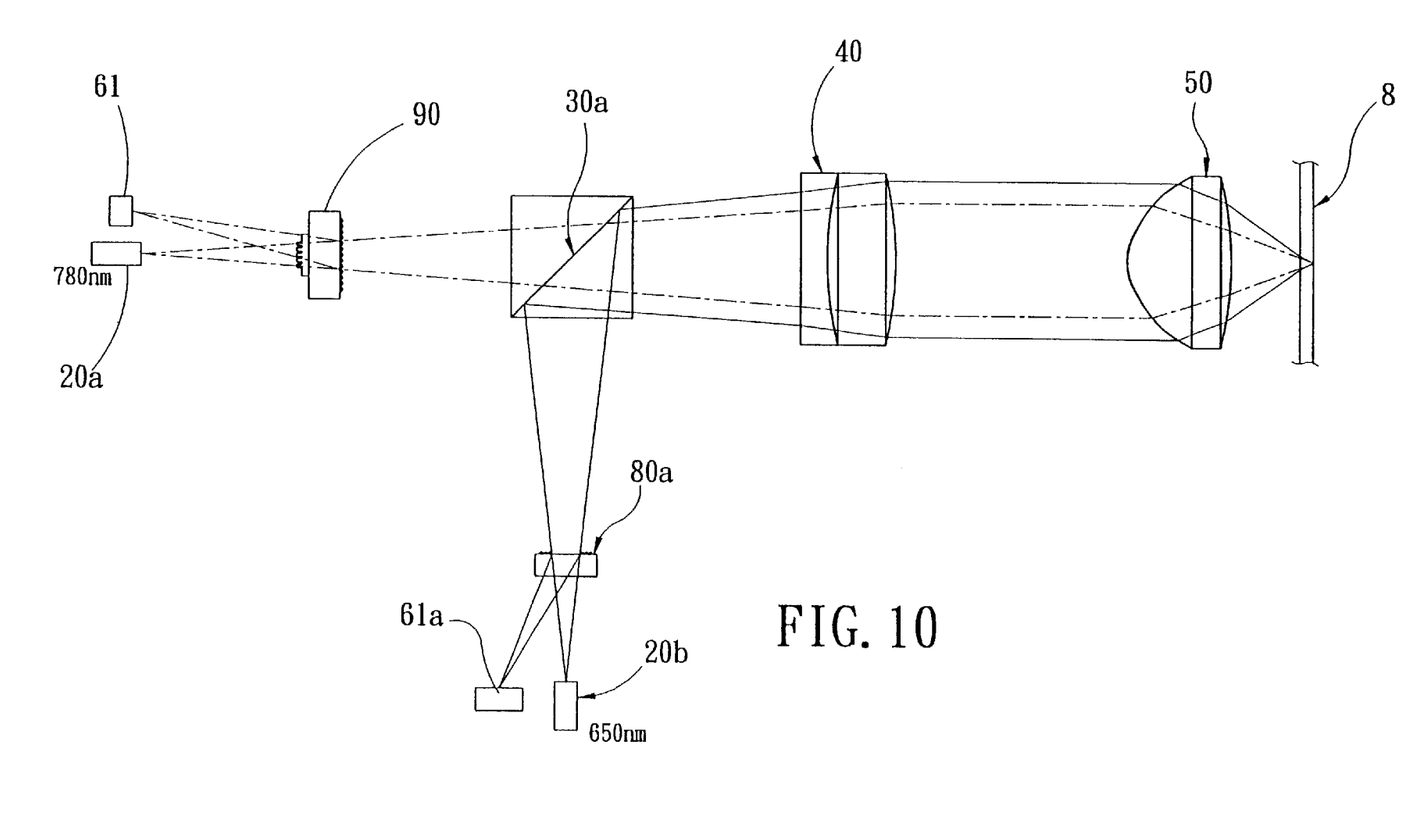
FIG. 10 shows a bifocal optical pickup head of a fifth embodiment of the present invention in which an optical element, a three-beam grating and a holographic optical element are used with a two-source optical pickup head.

FIG. 10 shows a preferred embodiment in which a three-beam grating 70, an optical element 10 and a holographic optical element 80 are combined together to form an integrated optical element 90, which is used with a two-source optical pickup head. In this embodiment, a first laser diode 20a with wavelength of 780 mn and a second laser diode 20b with wavelength of 650 nm are for CD and DVD, respectively.

A laser beam emitted from the first laser diode 20a passes through the integrated optical element 90, a collimator lens 40 and an objective lens 50, and then is focused on a data storage surface of an optical disc 8. The laser beam reflected from the data storage surface of the optical disc 8 follows the opposite optical path, and is focused by the holographic optical element (HOE) 80 in the integrated optical element 90 on a photo detector 61 where the laser beam representing a photo signal is converted into an electric signal. A laser beam emitted from the second laser diode 20b passes through a beam splitter cube 30a, the collimator lens 40 and the objective lens 50, and then is focused on the data storage surface of the optical disc 8. The laser beam reflected from the data storage surface of the optical disc 8 follows the opposite optical path, and is focused by a holographic optical element (HOE) 80a on another photo detector 61a where the laser beam representing a photo signal is converted into an electric signal.

According to the present invention, to access both CD and DVD, it is unnecessary to add any other optical elements such as zooming aperture, movable objective lens or dual objective lenses. The present invention provides advantages of simple structure, low cost, easy assembly and high tolerance. Besides, the optical element of the present invention is adapted to a conventional optical pickup head, holographic optical pickup head or two-source optical pickup head.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

| INDEX | | | |
|---|---|---|---|
| 10 | optical element | 10a | optical element |
| 11 | first refraction surface | 12 | second refraction surface |
| 13 | transparent body | 130 | cylinder |
| 131 | cylindrical recess | 20 | laser diode |
| 20a | first laser diode | 20b | second laser diode |
| 30 | beam splitter cube | 30a | first beam splitter cube |
| 30b | second beam splitter cube | 40 | collimator lens |
| 50 | objective lens | 60 | condensing lens |
| 61 | photo detector | 61a | photo detector |
| 70 | three-beam grating | 8 | optical disc |
| 80 | holographic optical element | 80a | holographic optical element |
| 81 | DVD | 82 | CD |
| 90 | integrated optical element | | |

What is claimed is:

1. An optical element used with a bifocal optical pickup head including a laser diode, a collimator lens and an objective lens, said optical element being interposed between said laser diode and said collimator lens, for splitting a laser beam emitted from said laser diode into two laser beams of different optical paths, wherein said optical element comprises a first and a second refraction surfaces perpendicular to axial direction of said laser beam, and said first and second refraction surfaces are concentric about axis of said laser beam and located at two different places corresponding to different optical paths and different radiuses of said laser beam.

2. The optical element used with the bifocal optical pickup head according to claim 1, wherein said optical element comprises a flat transparent body provided with a protruded cylinder at a side thereof, and a surface of the transparent body at the same side with said cylinder is formed as said first refraction surface, while an axial end surface of said cylinder is formed as said second refraction surface.

3. The optical element used with the bifocal optical pickup head according to claim 2, wherein said cylinder has a radial section of which shape is on the basis of section shape of said laser beam.

4. The optical element used with the bifocal optical pickup head according to claim 2, wherein said cylinder has a circular cross section.

5. The optical element used with the bifocal optical pickup head according to claim 1, wherein said optical element comprises a flat transparent body provided with a cylindrical recess at a side thereof, and a surface of the transparent body at the same side with said cylindrical recess is formed as said first refraction surface, while an axial end surface of said cylindrical recess is formed as said second refraction surface.

* * * * *